Dec. 14, 1954  A. W. METZNER  2,696,982
STRIP FEEDING APPARATUS
Filed July 3, 1950  5 Sheets-Sheet 1
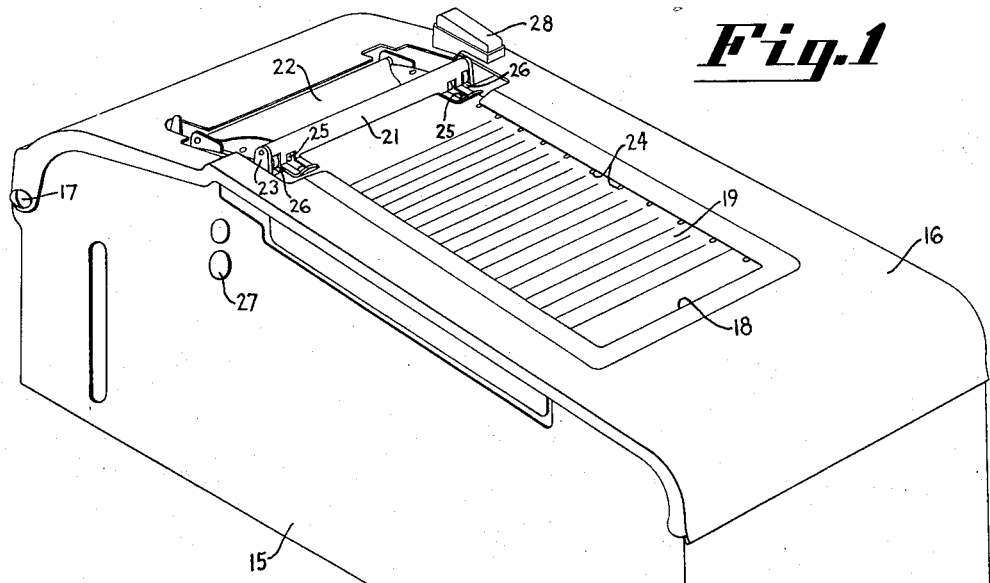
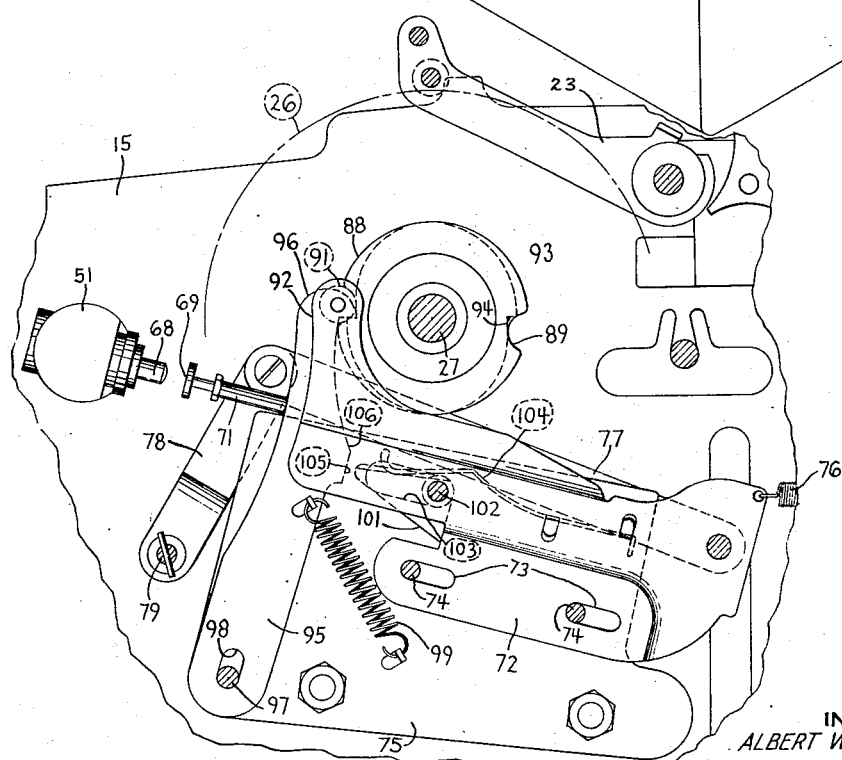
INVENTOR
ALBERT W. METZNER
BY Tom Walker
ATTORNEY

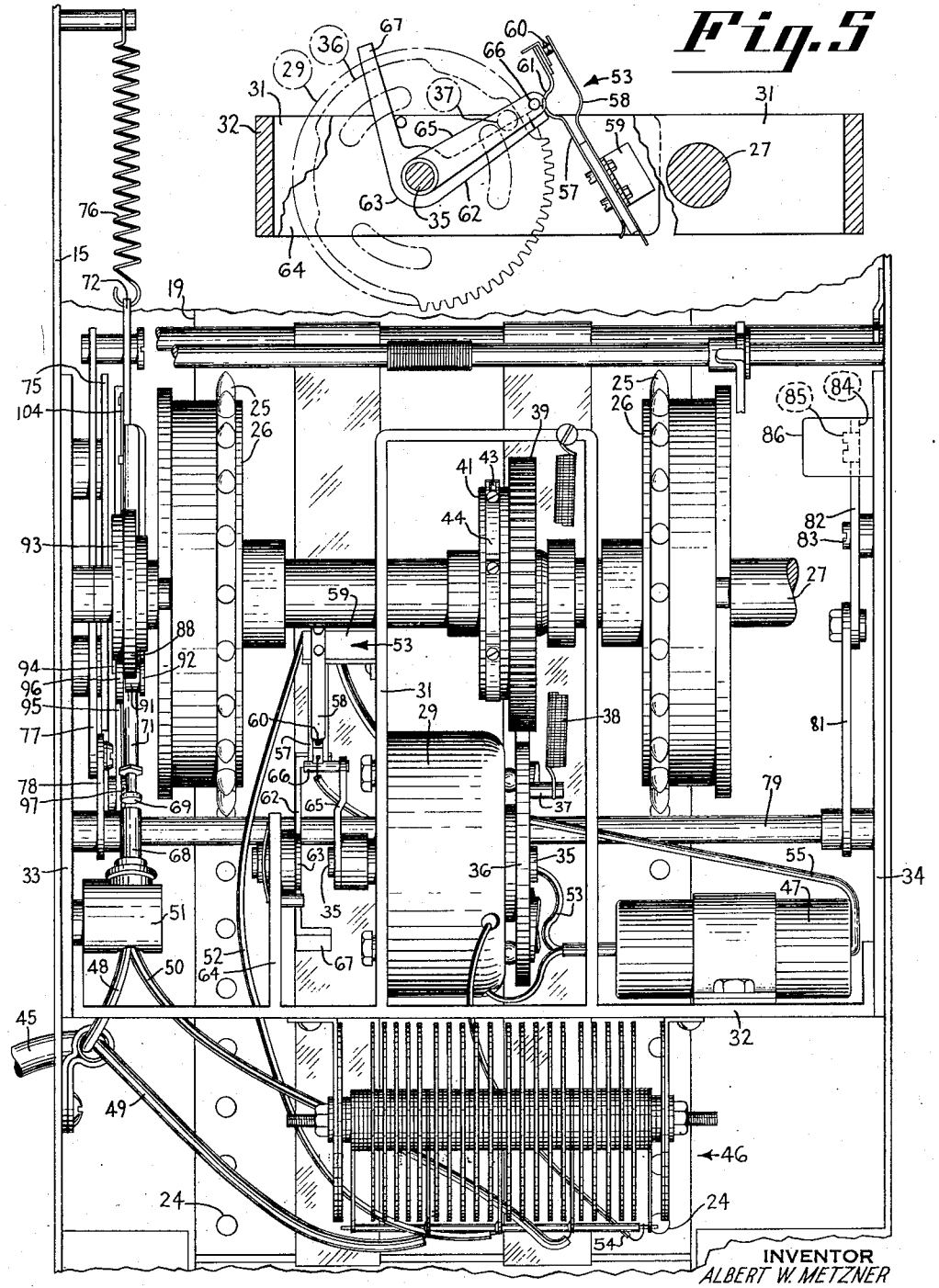

Dec. 14, 1954  A. W. METZNER  2,696,982
STRIP FEEDING APPARATUS
Filed July 3, 1950  5 Sheets-Sheet 3
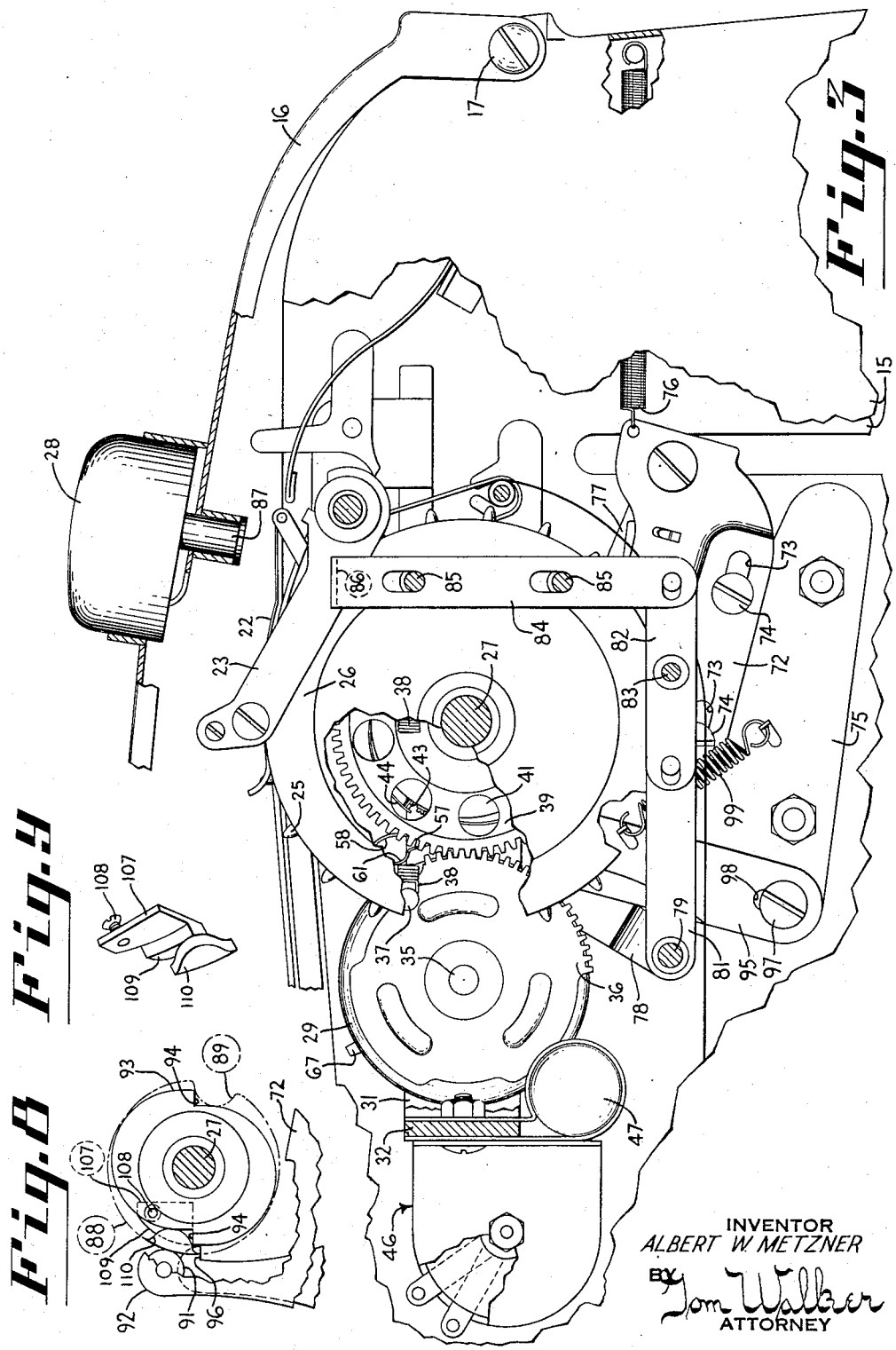
INVENTOR
ALBERT W. METZNER
BY Tom Walker
ATTORNEY Dec. 14, 1954  A. W. METZNER  2,696,982
STRIP FEEDING APPARATUS
Filed July 3, 1950  5 Sheets-Sheet 4
*Fig. 7*
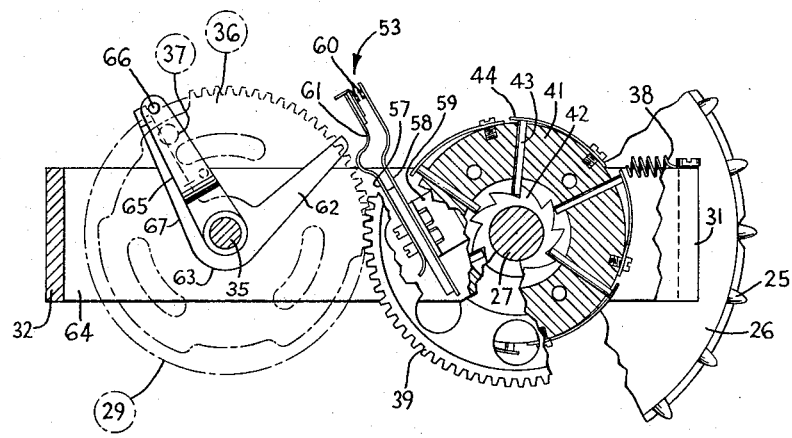
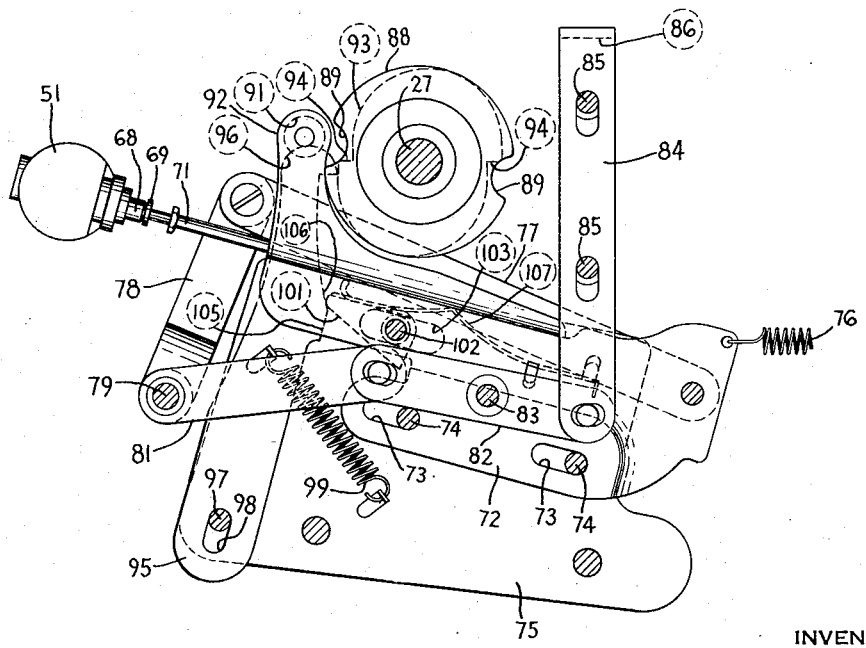
*Fig. 6*
INVENTOR
ALBERT W. METZNER
BY Tom Walker
ATTORNEY Dec. 14, 1954   A. W. METZNER   2,696,982
STRIP FEEDING APPARATUS
Filed July 3, 1950   5 Sheets-Sheet 5

INVENTOR
ALBERT W. METZNER
BY Tom Walker
ATTORNEY

United States Patent Office 2,696,982
Patented Dec. 14, 1954

2,696,982

STRIP FEEDING APPARATUS

Albert W. Metzner, Dayton, Ohio, assignor to The Standard Register Company, Dayton, Ohio, a corporation of Ohio Application July 3, 1950, Serial No. 171,830

12 Claims. (Cl. 271—2.4)

This invention relates to strip feeding apparatus, and more particularly to autographic registers and like machines wherein a continuous record strip is progressively advanced to present successive record forms in recording position.

The invention is particularly concerned, and as such has a more general application, with electromechanical feed or strip advancement mechanism wherein the operator is relieved of the necessity of manually cranking the feed devices for advancement of the record strip.

The object of the invention is to simplify the construction as well as the means and mode of operation of electromechanical strip feeding apparatus, whereby such apparatus may not only be economically manufactured but will be more efficient and satisfactory in use, adaptable to a wide variety of operating conditions, having relative few parts and be unlikely to get out of repair.

A further object of the invention is to utilize in a mechanism of the kind described a rotary type solenoid, there being provided means for obtaining repetitive oscillatory cycling of the solenoid with such action being transmitted to the feed devices in the form of a step-by-step rotary movement.

Another object of the invention is to obtain such improved control over the strip advancement mechanism as to obtain positive and accurate positioning of the successive forms at the recording station.

A further object of the invention is to facilitate adaptation of the automatic apparatus for use in issuing forms of varying length.

Still another object of the invention is to achieve a construction and arrangement of parts, whereby the invention may be embodied in existing cabinet designs without material alteration in the external appearance or manner of use of registers as heretofore known.

A still further object of the invention is to present alternative constructions particularly suited for use in respectively large and small size registers.

A further object of the invention is to provide a machine possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is found the preferred but obviously not necessarily the only form of embodiments of the invention, Fig. 1 is a perspective view of an autographic register in accordance with the instant invention;

Fig. 2 is a top plan view of the register with the lid removed;

Fig. 3 is a side elevation view of the register with part of the casing broken away;

Fig. 4 is a detail view of control linkage including certain control discs for starting and discontinuing action of the feed devices, the parts being shown in a normal or non-operated position;

Fig. 5 is a detail view of the switch mechanism for effecting oscillating movements of the solenoid;

Fig. 6 is a view similar to Fig. 4, with the addition of push button operated linkage, showing the parts as they appear immediately following depression of the push button;

Fig. 7 is a view similar to Fig. 5, with the addition of clutch devices operated by the solenoid, showing the switch mechanism at an extreme of movement opposite to that shown in Fig. 5;

Fig. 8 is a detail view showing how an adapter plate may be applied to the control discs to modify the operation thereof;

Fig. 9 is a detail view of the adapter plate;

Like parts are indicated by similar characters of reference throughout the several views.

Figure 10:
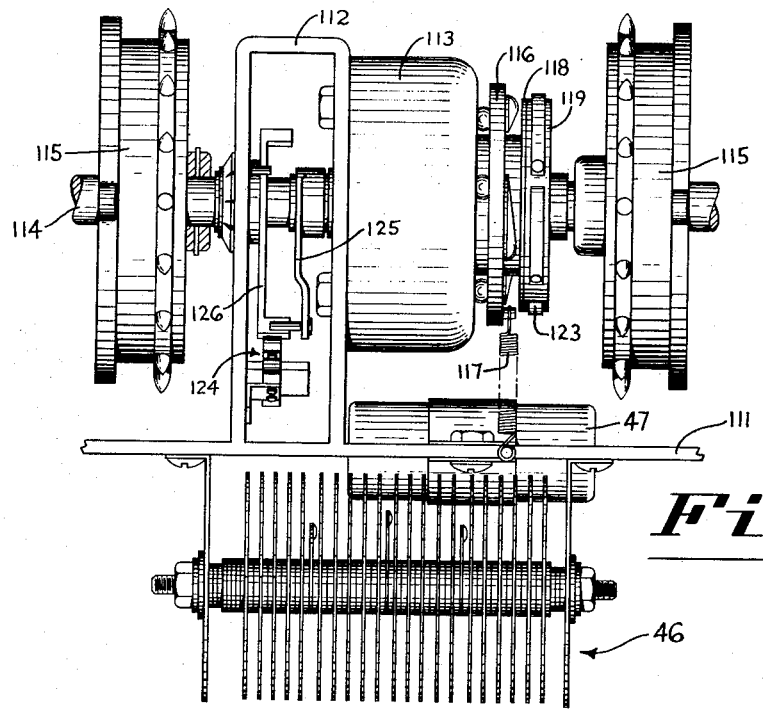
Fig. 10 is a fragmentary view similar to Fig. 2, showing a modified installation of the invention.

Referring to Fig. 1 of the drawings, an autographic register of the type to which the invention is applicable comprises an external casing 15, rectangular in shape and presenting an open top closed by a lid 16. The lid 16 is hinged at 17 to the front of the casing and is formed with an elongated opening 18 exposing a writing table (not shown) over which a continuous record strip 19 is passed. The strip 19 is made up of connected forms which are brought successively to the writing area or position defined by the lid opening 18. The strip 19 is stored in pack form in a compartment at the rear of the casing 15 and extends beneath the lid opening 18 and in underlying relation to a tear bar 21. Passing beneath the tear bar 21, the strip encounters a flutter plate 22 and is ejected thereby or directed into a storage compartment at the front of the casing 15. The tear bar 21 is lifted and lowered by linkage 23, in a manner which it is unnecessary here particularly to consider, alternately to permit advance of the strip and to apply pressure thereto to secure the strip for recording and to enable an issued form to be torn from the strip.

For advancement of the successive forms to and from the writing position, the record strip 19 is formed with marginal perforations 24 engageable by pins 25 set in the peripheries of a pair of laterally spaced wheels 26. The pin wheels 26 are secured to a rotatable shaft 27 journaled between the side walls of the casing 15. In response to rotation of the shaft 27, in a counterclockwise direction as viewed in Fig. 1, the wheels 26 turn correspondingly, causing successive pins 25 to enter successive perforations 24 thereby effecting advancement of the record strip outwardly beneath the tear bar 21.

In accordance with the instant invention, rotation of the shaft 27 and thereby advancement of the strip 19, is effected automatically in response to actuation of a push button 28 conveniently mounted in the lid 16 to be depressed by the hand of the operator.

Referring to Figs. 2, 3, 5 and 7, and particularly to Fig. 2, the power for turning the shaft 27 is derived from a commercially known rotary type solenoid 29. The solenoid 29 is located immediately forwardly of the shaft 27 and is fastened to an internal wall of a rectangular frame 31 integrally united with a transverse plate 32. The plate 32 forms part of a mounting assembly further including side plates 33 and 34 secured to the inner surfaces of the side walls of the casing 15. The mounting assembly provides a support for the various devices entering into automatic rotation of the shaft 27. A large part of such devices may thereby be constructed in a sub-assembly and inserted as a unit into the casing 15 to which the side plates 33 and 34 may be secured by screws or the like. As a further advantage, the need for mounting shafts, brackets and the like directly in or on the casing 15 is obviated. Equipped in accordance with this invention, therefore, a register has its customary appearance and is used in the conventional manner except that instead of turning the shaft 27 with a crank handle the same result is accomplished simply by depressing the button 28.

Returning to a consideration of the solenoid 29, there extends axially through the solenoid an armature 35 which in response to energizing of the solenoid rocks in a counterclockwise direction as viewed in Figs. 3 and 5. Secured to one projecting end of the armature is a gear sector 36 provided with a laterally projecting pin 37. A retractible spring 38 is connected at its one end to the pin 37 and is anchored at its other end to the frame piece 31. A rocking motion of the armature 35, as described, will therefore turn the gear sector 36 correspondingly and tension the spring 38. Thus upon deenergizing of the solenoid 29, the armature 35 and gear sector 36 will be rocked in a return direction (clockwise as seen in Figs. 3 and 5). Accordingly, an alternate energizing and deenergizing of the solenoid will produce oscillating cyclic movements of the armature 35 and gear sector 36.

The gear sector 36 meshes with a gear 39 secured in side by side relation to a clutch rotor 41, the assembly comprising gear 39 and rotor 41 loosely surmounting shaft 27. The rotor 41 is in surrounding relation to a ratchet wheel 42 (Fig. 7) secured to the shaft 27. A plurality of pins 43 are radially carried by the rotor 41 and are urged inward by peripheral individual leaf springs 44 to engage and ride on the teeth of ratchet wheel 42. It will be apparent that the assembly comprising rotor 41, with its pins 43, and the ratchet wheel 42 makes up a one-way clutch mechanism in which rotation of the rotor 41 in a clockwise direction as seen in Fig. 7 will effect a corresponding rotation of wheel 42 and shaft 27 whereas rotation of the rotor in the opposite direction will be accomplished independently of the wheel 42 and shaft 27. Since the gear 39 is directly connected to gear sector 36, rotor 41 rocks in accompaniment with the oscillation of the armature 35 although in an opposed sense. For each cyclic oscillation of the armature 35, therefore, the shaft 27 has imparted to it an increment of rotary motion which, in accordance with the instant construction and arrangement of parts, is in a clockwise direction as seen in Fig. 7. Motion of the shaft 27 is in this instance, therefore effected during that portion of the armature cycle induced by energizing of the solenoid 29. It will be understood that the arrangement could be reversed, with actuation of the shaft 27 taking place during the return stroke of the armature or that effected by the release of energy stored in spring 38.

Figure 11:
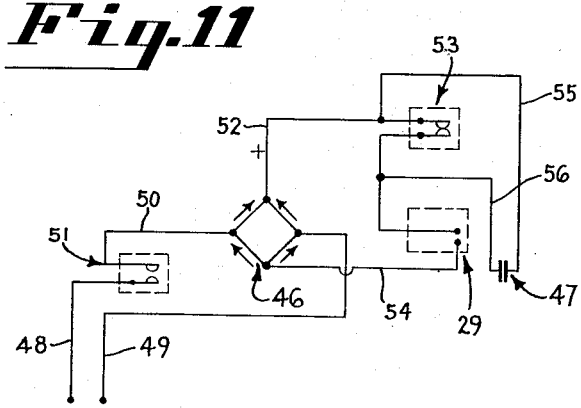
Fig. 11 is a wiring diagram.

Energizing of the solenoid 29 is accomplished by connecting it in an electrical circuit which includes a conductor 45 (Fig. 2) entering the side of casing 15 and leading from a suitable source of electrical energy. Since such source will ordinarily be one of alternating current, the electrical circuit further includes a rectifier 46 and a condenser 47. Referring also to the diagram of Fig. 11, separate leads 48 and 49 emerging from the conduit 45 are connected respectively to a switch 51 and to the rectifier 46. A lead 50 connects switch 51 to the rectifier 46. From the rectifier 46, a positive lead 52 is connected through a switch 53 to the solenoid 29 and a negative lead 54 is connected directly to the solenoid. The condenser 47 is connected in the circuit by leads 55 and 56 to opposite sides of the switch 53.

The switch 51 stands normally open and represents a primary means of control whereby the circuit may be alternatively conditioned for alternate energizing and deenergizing of the solenoid under a secondary means of control represented by the switch 53. In the open position of switch 51 the circuit is inactive.

As shown in Fig. 5, the switch 53 comprises a pair of electrically conductive spring blades 57 and 58 carried by a block 59 secured to the exterior of frame piece 31. The blades 57 and 58 carry opposing contacts 60 on their outer ends and are tensioned to spring apart and separate the contacts 60. The blade 57 has an outturned shoulder 61 adapted to be engaged by one arm 62 of a bellcrank lever 63. The lever 63 is pivotally mounted on a projecting wall 64 of frame plate 32, and, with the arm 62 thereof engaging shoulder 61 holds spring blade 57 biased in a position to engage contacts 60. An oscillating motion of the lever 63 will, it is observed, cause arm 62 alternately to engage and disengage shoulder 61 with the effect of alternately engaging and disengaging contacts 60.

Such motion of the lever 63 is accomplished by an arm 65 secured to the opposite or leftward extending end of solenoid armature 35 and carrying a laterally projecting pin 66. The pin 66 on arm 65 is arranged to contact the edge of arm 62 and also the edge of another arm 67 on lever 63, the arms 62 and 67 being spaced apart a distance approximately corresponding to the extent of rocking motion permitted the armature 35.

In the operation of this assembly of parts, therefore, as the armature 35 approaches its clockwise limit of oscillating motion (effected under influence of spring 38) the pin 66 on arm 65 engages arm 62 and rocks lever 63 in a clockwise direction whereby arm 62 acts as a cam on shoulder 61, moving spring blade 57 in a direction to close the contacts 60. In response to closing of the contacts 60, a circuit is established through the solenoid 29 whereupon armature 35 rocks in a reverse or counterclockwise direction. The pin 66 on arm 65 accordingly moves away from arm 62, which continues to hold the spring blade 57 biased to closed position, and travels toward the arm 67. Reaching arm 67 near the end of the counterclockwise motion of armature 35, the pin 66 rocks lever 63 counter-clockwise and disengages arm 62 from shoulder 61. Blade 57 being so released, the contacts 60 are separated thus opening the switch and deenergizing solenoid 29. This position of the parts will prevail during the return travel of the armature under influence of the spring 38 until near the end of such motion when pin 66 will reengage arm 62 and rock blade 57 to again close the contacts 60.

As long as the primary control switch 51 remains closed, therefore, there will take place a repeated cycling of the armature shaft 35 under control of switch 53 resulting in the imparting of repeated increments of turning motion to the pin wheel shaft 27. It will be understood that the described action occurs rapidly, producing a motion of shaft 27 which is without material visible interruption.

The switch 51 is operated by a plunger 68, which, when depressed or pushed inwardly, closes the electrical circuit through the switch. The plunger 68 is spring biased outward, in a manner not here shown, so that upon release of the inwardly depressing pressure the electrical circuit through the switch automatically is opened. Actuation of the plunger is effected by a screw stud 69 adjustably received in a projection 71 integral with or otherwise secured to a slide 72 (see Figs. 2, 4 and 6). The slide 72 is formed with slots 73 receiving studs 74 set in a plate 75 secured in parallel spaced relation to the side frame plate 33. A retractile spring 76, anchored to the casing 15, urges the slide 72 to the position shown in Fig. 4 wherein the studs 74 occupy a rearward or leftward position in the slots 73. As so positioned, the screw stud 69 in projection 71 is out of contact with switch actuating plunger 68. Motion of slide 72 to its opposite limit of movement, as defined by studs 74 in slots 73, is effective to engage and depress 68 through screw stud 69; as is illustrated in Fig. 6.

Such motion is accomplished through a link 77 pivotally connected at its one end to slide 72 and at its other end to an arm 78 secured to a shaft 79 journaled between the side frames 33 and 34. The arm 78 is located adjacent one end of the shaft 79. Adjacent the opposite end thereof, there is secured to the shaft 79 an arm 81 (see Fig. 3). The free outer end of arm 81 is pivotally connected to one end of a lever 82 which is pivoted at its middle on a stud 83 in frame 34 and connected at its opposite end to an upstanding link 84. The link 84 is guided by studs 85 in the frame 34 for limited vertical sliding movement. The upper end thereof is formed with a turned over lug 86 in underlying relation to a stem 87 on the manually depressible push button 28. Under the influence of spring 76 the above described linkage for actuating slide 72 normally occupies the position shown in Fig. 3 wherein link 84 is in its uppermost position presenting lug 86 to be engaged and depressed by a corresponding movement of button 28. In response to depression of link 84, lever 82 turns clockwise, as seen in Fig. 3, effecting a counter-clockwise direction of motion of arm 81, shaft 79, arm 78 and link 77 whereby to draw slide 72 rearwardly and depress the actuating plunger 68 of switch 51.

After depression of the switch actuating plunger 68 by manual operation of the push button 28, further control of the switch 51 passes to automatic means in the register so that the shaft 27 may receive an accurately determined number of increments of turning impulses from the previously described electromechanical devices. Such automatic means includes a disc 88 fixed to the shaft 27 and presenting a pair of diametrically opposed peripheral recesses 89. Cooperable with the disc 88 is a roller 91 on an upstanding arm 92 formed integrally with the slide 72. When the slide 72 is retracted by spring 76, the roller 91 is received in one or the other of the recesses 89. Upon depression of button 28, however, to shift slide 72 rearwardly and close switch 51, the roller 91 is carried out of the recess 89. Then as shaft 27 begins to rotate, the cam 88 turns correspondingly to present a high surface to roller 91. Return motion of the slide 72 is blocked thereby so that plunger 68 will be held depressed and switch 51 held closed until the opposed recess 89 achieves registry with the roller 91. When this occurs, roller 91 will drop into the recess as slide 72 retracts under influence of spring 76 to release plunger 68 and allow switch 51 to open.

A positive motion arresting means for the shaft 27 is provided in the form of another disc 93 fastened to the shaft 27 alongside the disc 88 and presenting a pair of diametrically opposed radial abutment shoulders 94. Cooperable with the disc 93 and shoulders 94 is a latch lever 95 having a hooked upper end 96 arranged to bear against the periphery of the disc 93 and engage the successively presented shoulders 94. The lever 95 is pivotally mounted on a stud 97 set in the stationary plate 75, the stud 97 being received in a slot 98 in the lever 95 whereby to allow limited vertical sliding motion of the lever. A spring 99 is connected to the lever 95 and anchored to the frame 75 in such wise as to urge the lever downwardly and forwardly. The lever is, however, normally held in the upper rearward position of Fig. 4 by reason of engagement of the hooked end 96 thereof with a shoulder 94 on disc 93. As so engaged, the lever 95 prevents clockwise direction of rotation of the shaft 27 which is the direction of motion imparted to it by the electromechanical power devices.

Release of the latch lever 95 is accomplished by a pawl 101 pivotally mounted on a laterally projecting stud 102 on the slide 72, the stud 102 being received in a clearance slot 103 in the plate 75. That portion of the slide 72 mounting the pawl 101 is bent out laterally and provides a stop for the pawl in a counterclockwise direction against which the pawl is urged by an overlying leaf spring 104 mounted on the slide 72. The nose of pawl 101 is normally in line with a flat or land 105 on the edge of lever 95. Accordingly, and since the pawl 101 is carried rearwardly with slide 72 in response to depression of the push button 29, the pawl is effective to rock the lever 95 counter-clockwise as a part of the same movement by which switch 51 is closed and roller 91 moved out of registry with a recess 89. Such motion is effective to disengage the hooked end 96 of the lever from the shoulder 94 engaged thereby whereupon the lever is retracted downwardly and forwardly by spring 99. This is the position of the parts shown in Fig. 6, and it will be noted that the hooked end 96 of the lever engages a high surface on the disc 93 which tapers gradually to the diametrically opposed shoulder 94. As further seen in Fig. 6, the retractive motion of the lever 95 has further resulted in camming the pawl 101 in a clockwise direction so that the nose thereof now rests on a sloping surface 106 above the land 105. When, in response to turning motion of the shaft 27, the next successive shoulder 94 on disc 93 reaches the hooked end 96 of lever 95, such end is engaged thereby and restored to the position of Fig. 4, the motion of the shaft 27 being positively arrested as the lever reaches the limit of such restoring movement as defined by the stud 97. Under the influence of spring 104, the pawl 101 will at the same time return to the position of Fig. 4 as a function of the restoring movement of the lever 95 and the retracting motion of slide 72.

The discs 88 and 93 are rotatively offset with regard to their respective recesses 89 and shoulders 94. That is, the arrangement is such that a recess 89 will reach cooperative relation with the roller 91 slightly before a shoulder 94 reaches cooperative relation with the hooked end 96 of lever 95. As a result, switch 51 is opened slightly prior to the arresting of the motion of shaft 27 thereby precluding the burning of contacts, and the like.

It will be understood that the discs 88 and 93 represent timing devices for regulating the duration of a strip advancing or issuing operation. As such they are constructed and arranged both with regard to the length of the forms and to the amount of "throw" or rotary motion imparted to the shaft 27 during each cycle of solenoid operation. In the illustrated instance, this "throw" amounts to ninety degrees or one quarter revolution of the shaft 27. It is further assumed in the illustrated instance that two such throws are required to advance the record strip one form length. The desired results are obtained, therefore, by using two recesses 89 and shoulders 94 arranged in diametrically opposed relation in such way that two cycles of solenoid operation are permitted. Should the form lengths be shorter by one-half, then four equally spaced recesses 89 and notches would be used, with the strip advancement then being completed in one cycle of solenoid operation. Similarly, in an installation calling for four cycles of solenoid operation to complete the desired strip advancement, only one recess 89 and shoulder 94 would be provided.

A conversion from a two cycle operation, as here illustrated and described, to a four cycle operation can be readily done by blanking out one of the recesses 89 and associated shoulder 94. Such a conversion is shown in Figs. 8 and 9. A plate 107 is fastened to the disc 93 by means of a screw 108 and is formed with a curved lamination 109 to enter and block a shoulder 94 and with a further lamination 110 to enter and block the associated recesses 89 in the disc 88.

Figure 12:
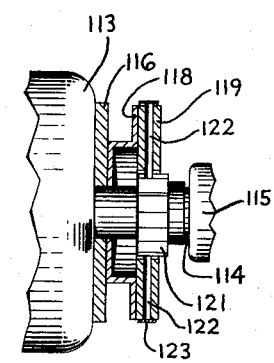
Fig. 12 is a detail view of the clutch mechanism of Fig. 10.

According to a slightly modified conception of the invention, particularly useful in small size registers, a separate mounting for the solenoid is obviated by placing it directly upon the pin wheel shaft. Referring to Figs. 10 and 12, in the modified embodiment the construction and arrangement of parts is identical to the first described form, except as hereinafter described, so that only the manner in which the solenoid effects rotation of the pin wheel shaft will be specifically referred to. In this instance a frame plate 111 replaces the frame 32, and is formed with a forwardly projecting rectangular portion 112. Fixed to the exterior of the frame portion 112 is the solenoid 113 disposed in surrounding relation to the pin wheel shaft 114 mounting pin wheels 115. The armature (not shown) of solenoid 113 is connected to a disc-like plate 116 constrained to a rearward rocking position by a spring 117 anchored to the frame 111. The plate 116 is in turn connected by a bracket 118 to a clutch rotor 119 surrounding a ratchet wheel 121 fast on the pin wheel shaft 114. Radially carried pins 112 in the rotor 119 are urged by springs 123 to contact with the ratchet teeth on wheel 121. Under the joint action of the solenoid 113 and spring 117 the rotor 119 performs repeated cyclic oscillations to impart in each cycle an increment of rotary motion to the shaft 114. On the opposite side of the solenoid 113 is the secondary switch mechanism including a switch 124 corresponding to the switch 53 of the first embodiment. Further an arm 125 corresponds to arms 65 of the first embodiment, and lever 126 corresponds to lever 63, the construction and arrangement of parts being the same as the corresponding switch mechanism of the first embodiment.

The operation of the apparatus of the invention (both forms thereof) is thought to be sufficiently clear from the preceding detailed description of parts. Briefly, however, the operator initiates a strip advancement operation by depressing the push button 28 which may then be immediately released. In response to depression of the push button, the linkage actuated slide 72 moves rearwardly effecting concomitantly the closing of switch 51, the disabling of latch lever 95 with respect to shoulder 94 on disc 93, and the moving of roller 91 out of a recess 89 in disc 88. The closing of switch 51 conditions the electrical circuit for successive energizing and deenergizing of the solenoid (29 or 113) under control of the vibratory switch (53 or 124). The cyclic oscillations so induced are transmitted to the pin wheel shaft as increments of turning motion thereof. A predetermined number of such increments of motion will bring a recess 89 on disc 88 to cooperative relation with roller 91 and will bring a shoulder 94 on disc 93 to cooperative relation with latch lever 95. As the parts reach these positions, slide 72 is released and retracted from a position holding switch 51 closed and at about the same time the pin wheel shaft is brought positively to rest by the lever 95.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In an autographic register or like device for advancing continuous record forms to and from a recording position, form advancing means including a rotatable shaft, electromechanical means for effecting a step-by-step rotation of said shaft including an electromagnet and an electrical circuit for energizing said electromagnet, a pair of switches in series relation in said circuit including a normally closed switch opened and closed at the opposite limits of motion of said electromagnet and a normally open switch arranged to be manually closed, and means carried by said shaft for holding said normally open switch closed during a predetermined degree of rotation of said shaft.

2. In an autographic register or like device for advancing continuous record forms to and from a recording position, form advancing means including a rotatable shaft, electromechanical means including an electromagnet, a spring return therefor and a one-way clutch connecting the electromagnet to said shaft whereby said shaft is advanced an increment of motion for each cycle of operation of said electromagnet, an electrical circuit for energizing said electromagnet including a first switch opened and closed by said electromagnet at the opposite limits of motion thereof and a second switch arranged to be manually closed, and means carried by said shaft for maintaining said second switch closed for a predetermined number of cycles of electromagnet operation.

3. In an autographic register or like device for advancing continuous record forms to and from a recording position, form advancing means including a rotatable shaft, a wheel mounted on said shaft for oscillating motion, a one-way clutch connecting said wheel to said shaft in such way that motion of the wheel in one direction imparts an increment of turning motion to the shaft whereas return motion of the wheel in the opposite direction is accomplished independently of the shaft, electromechanical means having motion in opposed senses for effecting oscillation of said wheel, and an electrical control circuit for said means including a first switch opened and closed by said means at the respective limits of the opposed motion thereof, and further including a second switch closed manually and opened automatically under control of said shaft after a predetermined number of increments of turning motion thereof.

4. An autographic register or like device according to claim 3, characterized by cam means driven by and in accompaniment with said shaft for maintaining said second switch closed through a predetermined number of cycles of opposed motions of said electromechanical means.

5. In an autographic register or like device for advancing continuous record forms to and from a recording position, form advancing means including a rotatable shaft, an oscillatory actuator for turning said shaft, a connection between said actuator and said shaft including a one-way clutch whereby one increment of turning motion is imparted to said shaft for each oscillating cycle of said actuator, a rotary type solenoid having a transversely extending oscillatory armature projecting from the opposite sides of the solenoid, said actuator being secured to one end of said armature, a spring to effect motion of said armature in one direction, an electrical circuit to supply electrical energy to said solenoid to move said armature in the opposite direction and to tension said spring, an on-off switch in said circuit, operating means for said switch on the opposite end of said armature turning said switch respectively on and off at the opposite limits of movement of said armature, another switch in said circuit normally open and manually closed, and cam means on said shaft to hold said other switch closed through a predetermined number of increments of turning motion of said shaft.

6. In an autographic register or like device for advancing continuous record forms to and from a recording position, form advancing means including a rotatable shaft, a rotary type solenoid having a transversely extending oscillatory armature, a spring to effect motion of said armature in one direction, an electrical circuit to supply electrical energy to said solenoid to move said armature in the opposite direction, an armature operated switch control in said circuit to effect oscillatory cycling of said armature under the joint action of said spring and said solenoid, a normally open manually closed master switch in said circuit, and means for imparting an increment of rotary turning motion to said shaft for each oscillatory cycle of said armature.

7. In an autographic register or like device for advancing continuous marginally punched record forms to and from a recording position, form advancing means including pin wheels to engage the margins of the forms and a transverse rotatable shaft mounting said pin wheels adjacent the opposite ends thereof, a rotary type solenoid mounted in surrounding relation to said shaft between said pin wheels and having a laterally projecting oscillatory armature, an actuator loosely surmounting said shaft and driven by said armature, a one-way clutch between said actuator and said shaft for resolving an oscillatory cycle of said armature into an increment of turning motion of said shaft, and controls for said solenoid to effect a predetermined number of cyclic oscillations of said armature and thereby a predetermined extent of turning motion of said shaft.

8. In an autographic register or like device for advancing continuous marginally punched record forms to and from a recording position, form advancing means including pin wheels to engage the margins of the forms and a transverse rotatable shaft mounting said pin wheels adjacent the opposite ends thereof, an oscillatory actuator loosely surmounting said shaft between said pin wheels, a one-way clutch connecting said actuator to said shaft, a rotary type solenoid supported in adjoining relation to said shaft and having an oscillatory armature projecting in parallel relation to said shaft, a connection for transmitting the oscillatory motion of said armature to said actuator, electrical controls for energizing and deenergizing said solenoid, and a spring operable in conjunction with said controls to effect oscillating cycling of said armature.

9. In an autographic register or like device for advancing continuous record forms to and from a recording position, form advancing means including a rotatable shaft, an oscillatory actuator for turning said shaft, a connection between said actuator and said shaft including a one-way clutch whereby one increment of turning motion is imparted to said shaft for each oscillating cycle of said actuator, electromechanical means for operating said actuator, controls for said means including a normally open switch and a vibratory switch opened and closed during each oscillating cycle of said actuator, manual means for closing said normally open switch, and means operated by said shaft for controlling return of said normally open switch to open position.

10. In an autographic register or like device for advancing continuous record forms to and from recording position, form advancing means including a rotatable shaft, a rotary type solenoid having an oscillatory armature, an operating connection between said armature and said shaft resolving an oscillatory cycle of said armature into an increment of turning motion of said shaft, a spring urging said armature in one direction, an electrical control circuit including intermittently acting means for energizing said solenoid to rock said armature in the opposite direction against the urging of said spring, and means in said circuit operating under manual control and under the control of said shaft for rendering said intermittently acting means alternatively effective and ineffective.

11. In an autographic register or like device for advancing continuous marginally punched record forms to and from a recording position, form advancing means including pin wheels to engage the margins of the forms and a transverse rotatable shaft mounting said pin wheels, a rotary type solenoid installed in surrounding relation to said shaft and having a one-way driving connection therewith, a single action control plunger mounted on the register for depression by the hand of the operator, and controls for effecting repeated cyclic operations of said solenoid in response to depression of said plunger, 12. An autographic register or like device according to claim 11, characterized by means operating in response to rotation of said shaft for limiting the cyclic operations of said solenoid to a predetermined number in response to a single depression of said plunger.

References Cited in the file of this patent

UNITED STATES PATENTS

| Number | Name | Date |
|---|---|---|
| 1,437,949 | Sherman et al. | Dec. 5, 1922 |
| 2,199,556 | Carroll | May 7, 1940 |
| 2,451,467 | Bickel | Oct. 19, 1948 |